United States Patent
Enokida et al.

(10) Patent No.: US 6,853,378 B2
(45) Date of Patent: Feb. 8, 2005

(54) MOVING IMAGE EDITING APPARATUS AND MOVING IMAGE EDITING METHOD USING INTRAFRAME ENCODING

(75) Inventors: Miyuki Enokida, Yokohama (JP); Tadashi Yoshida, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/907,635

(22) Filed: Aug. 8, 1997

(65) Prior Publication Data

US 2002/0030684 A1 Mar. 14, 2002

Related U.S. Application Data

(63) Continuation of application No. 08/378,819, filed on Jan. 27, 1995, now abandoned.

(30) Foreign Application Priority Data

| Jan. 31, 1994 | (JP) | ............................................. 6-010083 |
| Jan. 20, 1995 | (JP) | ............................................. 7-007389 |

(51) Int. Cl.[7] .......................................... G06F 17/00
(52) U.S. Cl. ..................................... 345/473; 715/530
(58) Field of Search ................................ 345/473, 474, 345/475, 328; 348/384, 420, 426; 358/426, 310; 395/152, 153, 154; 715/530

(56) References Cited

U.S. PATENT DOCUMENTS

| 5,170,263 A | | 12/1992 | Hisatake et al. ............. 358/426 |
| 5,267,334 A | * | 11/1993 | Normille et al. ............. 382/236 |
| 5,315,326 A | * | 5/1994 | Sugiyama .................... 348/415 |
| 5,371,547 A | * | 12/1994 | Siracusa et al. ............. 348/426 |
| 5,387,938 A | * | 2/1995 | Fukuda et al. .............. 348/420 |
| 5,404,437 A | * | 4/1995 | Nguyen ....................... 395/152 |
| 5,408,328 A | * | 4/1995 | Boliek et al. ............ 358/261.4 |
| 5,442,400 A | * | 8/1995 | Sun et al. .................... 348/402 |
| 5,461,679 A | * | 10/1995 | Normile et al. ............. 382/304 |
| 5,467,134 A | * | 11/1995 | Laney et al. ................ 348/409 |
| 5,577,191 A | * | 11/1996 | Bonomi ....................... 345/502 |
| 5,606,655 A | * | 2/1997 | Arman et al. ............... 345/440 |
| 5,623,344 A | * | 4/1997 | Lane et al. ................... 386/81 |
| 5,675,693 A | * | 10/1997 | Kagoshima .................. 386/68 |
| 5,699,128 A | * | 12/1997 | Hayashi ..................... 348/699 |

FOREIGN PATENT DOCUMENTS

| EP | 0392753 | 10/1990 |
| EP | 0456433 | 11/1991 |
| JP | 63-311888 | 12/1988 |
| JP | 4-72977 | 3/1992 |
| JP | 4-328982 | 11/1992 |
| JP | 5-7356 | 1/1993 |
| JP | 5-135144 | 6/1993 |

OTHER PUBLICATIONS

Yuong–Wei Lei, et al., "A New Architecture for a TV Graphics Animation Module", IEEE 1993 International Conference on Consumer Electronics, vol. 39, No. 4, pp. 795–800 (Jun. 1993).

* cited by examiner

*Primary Examiner*—Sanjiv Shah
(74) *Attorney, Agent, or Firm*—Fitzpatrick, Cella, Harper & Scinto

(57) ABSTRACT

Encoded moving image data is decoded, the decoded moving image data is intraframe encoded and stored, and the image which was stored and intraframe encoded is decoded and subjected to an arbitrary edition, the edited frame image is encoded by an moving image encoding system, thereby reducing a memory capacity when a moving image edition is performed and realizing a high processing speed.

12 Claims, 6 Drawing Sheets

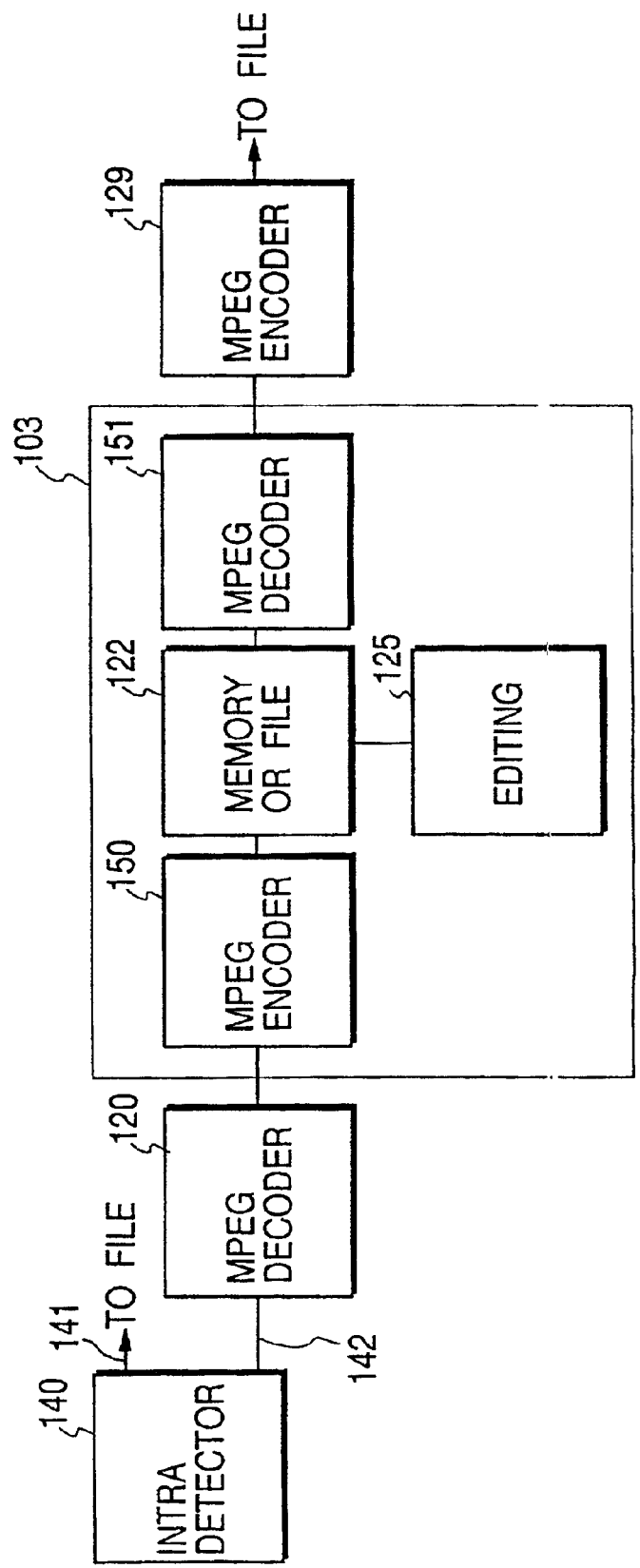

MOVING IMAGE EDITING APPARATUS AND MOVING IMAGE EDITING METHOD USING INTRAFRAME ENCODING

This application is a continuation of application Ser. No. 08/378,819, filed Jan. 27, 1995, now abandoned.

BACKGROUND OF THE INVENTION

1. Field of the Invention

The present invention relates to animating image editing apparatus and animating image editing method it for editing a coded animating image.

2. Related Background Art

Recently, coding methods of coding a digital animating image at a high compression ratio by using an interframe correlation have been standardized as international methods. There is an MPEG as a representative method. According to the MPEG, an interframe correlation is maximally used, a motion compensation is performed with reference to frames before and after a frame to be coded, and after that, an interframe differential coding is executed. FIG. 5 shows an example of the MPEG coding. In the coding frame types of the MPEG, I frame, P frame, and B frame have been coded as shown in the diagram. The I frame is the independent frame in an intraframe code and one frame is inserted per 15 frames. The P frame is a forward motion predictive frame and is an interframe code for performing the motion compensation by referring to the one-preceding P frame or the I frame. The B frame is an interframe predictive code for performing the motion compensation by predicting from both directions of the P and I frames before and after the B frame. The motion compensation is performed on a unit basis of a block which is called a macro block (MB) as shown in FIG. 6. The MB is a unit such that an animating image is digitized at a sampling ratio of 4:1:1 of Y (luminance component) and Cb and Cr (color difference components) and, after that, Y (16×16 pixels), Cb (8×8 pixels), and Cr (8×8 pixels) are set to a block. The motion compensation is executed in the B and P frames. Since the blocks having a strong correlation have to be searched (vector search) on a macro block unit basis, there is a drawback such that the processes of a coding unit are complicated as compared with those of a decoding unit. Particularly, when the coding is executed only by software, it is difficult to execute it in a real-time manner. It is, therefore, a present situation that only the decoding is performed by software. When the coding unit is realized by hardware, there is a draw back such that the circuit scale is extremely large.

As another problem, there is a problem at the time of the edition. Fundamentally, since the interframe difference is coded, it is difficult to perform a cut edition between arbitrary frames. For example, when an animating image is divided into two sequences at the position of ① in FIG. 5, there is a drawback such that the last frame cannot be decoded in the preceding sequence and the frames up to the next I frame cannot be decoded in the later sequence.

As a first method of solving the foregoing problems, there is a method of decoding all of the coded frame images and editing the decoded frame images after that.

The above method, however, has a drawback such that a memory of a large capacity is necessary to once accumulate the images after they were decoded.

In the above method, there is also a problem such that since all of the frame images need to be decoded irrespective of a fact such that the frame to be edited is a part of animating image and the decoded images are again encoded to accumulate them after that, the image deterioration is large.

As a second method of solving the foregoing problems, there is also an animating image processing apparatus using the intraframe coding method. For instance, there is a motion JPEG in which the JPEG system which is a coding of a color still image is independently applied to each frame of an animating image. In case of the motion JPEG, since the coding is also the intraframe coding, it is not so complicated as in the MPEG and a frame edition can be also freely performed. However, since the interframe correlation is not used, there is a drawback such that a compression efficiency is remarkably worse than that of the interframe coding.

SUMMARY OF THE INVENTION

It is an object of the invention to provide an animating image editing apparatus and an animating image editing method which can solve the foregoing drawbacks.

It is another object of the invention to provide an animating image editing apparatus and an animating image editing method which do hot require a memory of a large capacity when an editing process of coded animating image data is executed.

According to a preferred embodiment of the invention, the above objects are accomplished by an animating image editing apparatus comprising decoding means for decoding coded animating image data, storing means for intraframe coding the decoded animating image data and storing, editing means for decoding the intraframe coded image stored in the storing means and for performing an arbitrary edition to the image, and coding means for coding the edited frame image by an animating image coding method.

Still another object of the invention is to provide an animating image editing apparatus and an animating image editing method in which an amount of image data to be decoded is extremely suppressed when an editing process is performed for a predetermined frame.

Another object of the invention is to provide an animating image editing apparatus and an animating image editing method in which inputting an animating image data can be coded at a high speed and an image can be compressed at a high compression after edition.

Another object of the invention is to provide an animating image editing apparatus and an animating image editing method which can easily and promptly edit an animating image.

Another object of the invention is to provide an animating image editing apparatus and an animating image editing method which can edit an interframe coded animating image while minimizing a deterioration of a picture quality.

Another object of the invention is to provide an animating image editing apparatus and an animating image editing method having a novel function.

The above and other objects and features of the present invention will become apparent from the following detailed description and the appended claims with reference to the accompanying drawings.

BRIEF DESCRIPTION OF THE DRAWINGS

FIG. 11 is a block diagram of a main section of the sixth embodiment.

DETAILED DESCRIPTION OF THE PREFERRED EMBODIMENTS

<First Embodiment>

Figure 1:
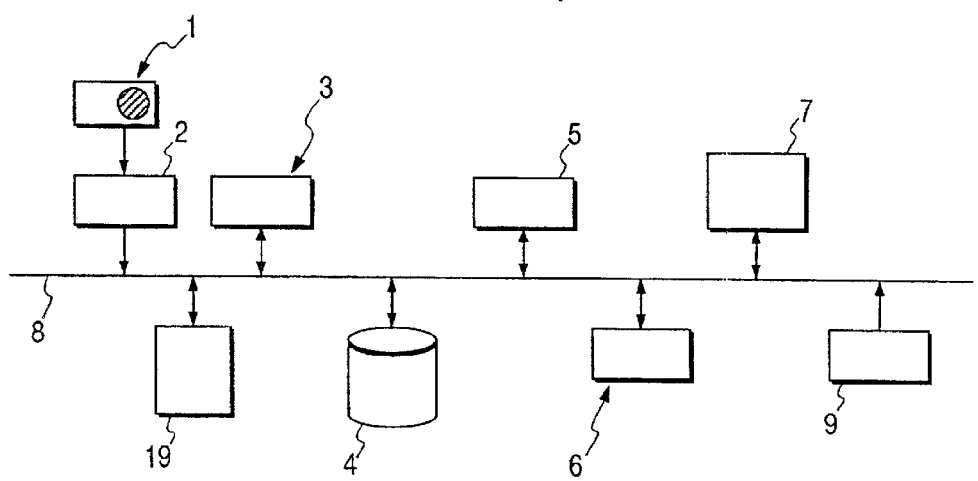
FIG. 1 is a diagram showing the first embodiment.

FIG. 1 is a block diagram of the first embodiment. Reference numeral 1 denotes a video camera for inputting an animating image; 2 a capture board unit for forming each frame of the animating image; 3 a JPEG codec unit for performing intraframe coding and decoding (processing a program by a CPU 9); 4 a disk for accumulating animating images; 5 a video RAM unit for outputting the decoded animating image to a display 7; 6 an MPEG codec unit for coding/decoding an interframe coded animating image (processing a program by the CPU 9); 9 the CPU to control the apparatus. An animating image to be processed is inputted from the video camera 1 and is digitized by the video capture board unit. Reference numeral 19 denotes an operation unit including a mouse, or a pointer, which will be described hereinlater. In the embodiment, (360 pixels×240 lines) construct one frame and digital animating images of 30 frames per second are formed. As pixel signals, the Y, Cb, Cr signals obtained by the sampling at the sampling ratio of (4:1:1) which is performed by the MPEG or the like are used. The Y, Cb, and Cr signals formed by the capture board unit 2 are coded in the frame by the JPEG codec unit 3 through a computer bus 8 in a real-time manner. The coding is executed by the JPEG system by regarding each frame as a still image on a frame unit basis. Since the JPEG coding system has been well-known, the description is omitted here. The coded animating images of 30 frames/second are stored into the disk 4 through the computer bus 8 in a real-time manner. In parallel with the coding, the digital animating images formed by the capture board unit 2 are sent to the video RAM unit 5 and are converted to the RGB signals for displaying the animating images and, after that, the images are displayed by the display 7 in a real-time manner. By the processes as mentioned above, while the animating image inputted from the video camera 1 is displayed by the display 7 in a real-time manner, the image is coded by the JPEG codec unit 3 and the coded data is stored into the disk 4. The input of the animating image to the disk 4 is continued until one animating image scene (hereinafter, referred to as a sequence) is finished. One sequence after completion of the input is reproduced on the display 7 as necessary. The reproducing process is performed as follows. Codes of one sequence are sequentially read out on a frame unit basis and are sent to the JPEG codec unit 3 which can perform the coding at a speed higher than that in the MPEG through the computer bus 8 and are decoded. The decoded frames are sequentially transferred to the video RAM unit 5 on the frame unit basis as Y, Cb, and Cr signals of (360 pixels×240 lines) and are displayed by the display 7 in a manner similar to the case of the foregoing real-time animating image input display (hereinlater, such an operation is called as a normal reproduction).

When one animating image sequence is inputted, generally, unnecessary portions are often included at the positions before and after or in the halfway of the sequence. According to the embodiment, therefore, the editing process is performed by using a feature of the intraframe coding such that each frame is independent.

Figure 2:
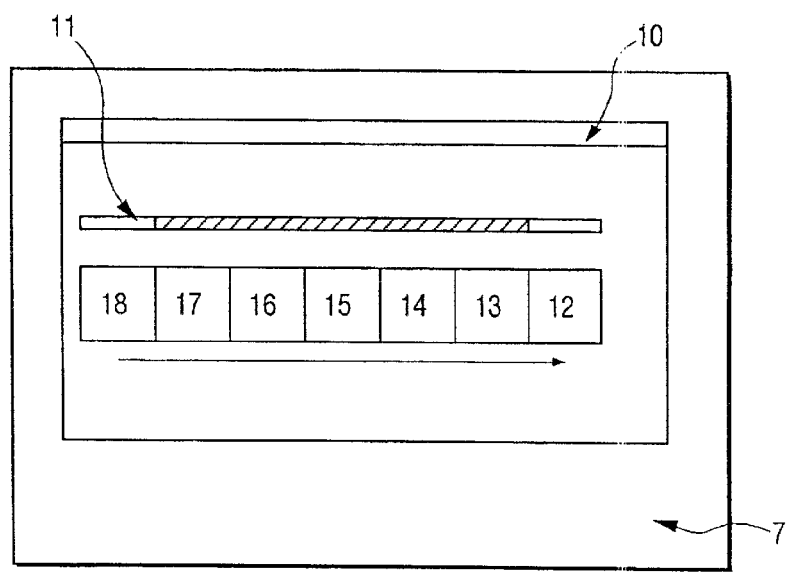
FIG. 2 shows an example of a display picture plane for edition.

FIG. 2 shows an example of edition. Reference numeral 7 denotes the display in which an edition window 10 is displayed. In the edition window 10, each frame of the sequence of the decoded animating image is displayed in a reduced size. As for the reduction, a normal method of simply thinning out is used and a resolution is decreased to a value such that the contents can be known, thereby enabling a few frames to be simultaneously displayed. Reference numeral 15 indicates a frame as a target point at the time of the edition. Reference numeral 14 denotes a one-preceding frame; 13 a two-preceding frame; 12 a three-preceding frame; 16 a one-later frame; 17 a two-later frame; and 18 a three-later frame.

In case of the normal reproduction, a frame of a size of (360 pixels×240 lines) is displayed in another window (not shown). At the time of the edition reproduction, however, since a plurality of frames before and after the target frame are displayed as mentioned above, the pixels reduced to about (¼×¼) are reproduced. In the edition reproduction, the frame 15 is set to a reproduction point and the frames before and after such a frame are moved and displayed as shown by an arrow. The frames are displayed in a normal speed mode, a slow speed mode, sequential frame display mode, or the like as necessary. Reference numeral 11 denotes an edition tool bar for cutting unnecessary frames and for selecting only necessary frames. FIG. 2 shows a state in which the frames 13 to 17 are selected (bars of the hatched portions) by a mouse or a pointer. In this case, the frames before the frame 12 and the frames after the frame 18 are unnecessary portions. The frames other than the necessary portions selected as mentioned above are deleted and edited from the disk 4. Since the code data stored in the disk 4 are the intraframe coded data, it can be easily edited. In the embodiment, the editing process is executed by the CPU 9 in a software manner. The edited code data can be confirmed by performing the normal reproduction as mentioned above.

The editing process mentioned above is performed on the basis of the intraframe code data which can be easily edited. After the edition, the intraframe code is converted to the interframe code having a compression efficiency higher than that of the intraframe code and the animating image is efficiently restored to the disk 4. One sequence of the edited intraframe codes stored in the disk 4 is read out every frame and is decoded by the JPEG codec unit 3 in a manner similar to the normal reproduction. Since there is no need to again convert the intraframe code to the interframe code in a real-time manner, however, it is sufficient for the JPEG codec unit 3 to decode in accordance with the speed of the interframe coding. In the embodiment, the MPEG system is used to again encode the decoded animating image to the interframe coded frame image. Since the re-encoding is performed by software by the CPU 9, it is executed by an idle time of the CPU.

Figure 5:
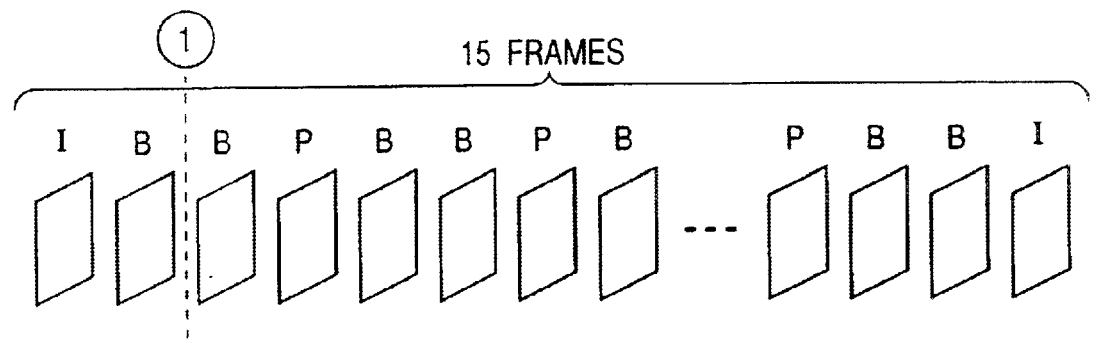
FIG. 5 is a diagram showing a state of a sequence when an interframe coding is performed.
Figure 6:
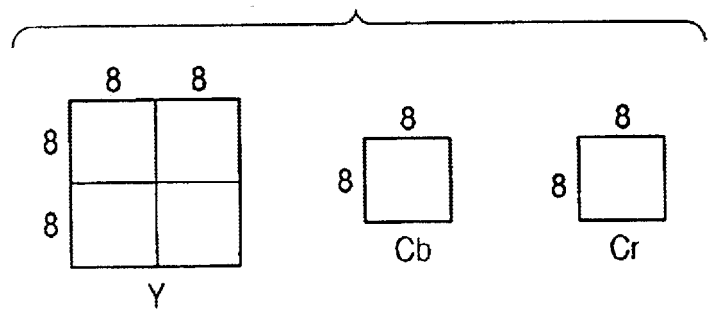
FIG. 6 is a diagram showing a macro block.

According to the MPEG coding, as shown in FIG. 5, the data is interframe/intraframe coded into three kinds of frame types of I, P, and B frames. The coded frames are again sequentially stored into the disk 4 in accordance with the order from the frame after completion of the coding and the above operation is continued until the end of the sequence, thereby finishing the re-encoding. After that, by deleting an unnecessary sequence of the intraframe codes, it is converted to the sequence in which the compression efficiency is improved so that the disk 4 is efficiently used.

As mentioned above, the animating image sequence which was re-encoded to the interframe codes is sequentially decoded by an MPEG codec 6 as necessary and can be also similarly produced to the display 7 via the video RAM unit 5.

As mentioned above, the input of the animating image is coded by the intraframe coding in a real-time manner, so that the coding can be easily performed with a small circuit scale as compared with the case of using the interframe coding by the MPEG. By using the intraframe code, the animating image can be easily edited. By converting the intraframe code to the interframe code of a good compression efficiency after the edition, the animating image process such that the input edition of the animating image is easy and the compression efficiency is high is realized.

<Second Embodiment>

Figure 3:
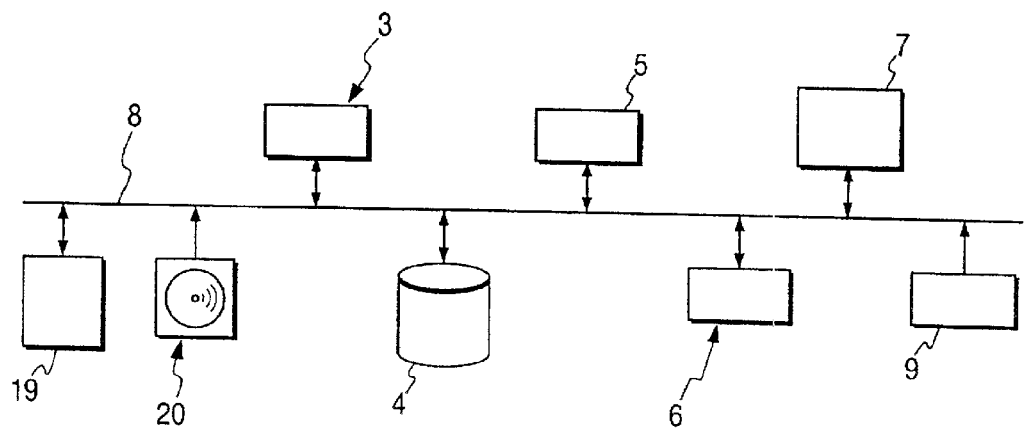
FIG. 3 is a diagram showing the second embodiment.

FIG. 3 is a diagram showing the second embodiment. The second embodiment relates to a case where animating images have already been converted to digital codes and stored in a CD-ROM or the like. In FIG. 3, reference numeral 20 denotes a CD-ROM player which is connected to the computer bus 8 by an SCSI bus. In FIG. 3, the same component elements as those in FIG. 1 are designated by the same reference numerals. The CD-ROM player 20 is an animating image reading apparatus for displaying animating image data generally stored in the CD-ROM onto the display 7. Codes are read out from the CD-ROM player 20 at a predetermined bit rate. It is generally desirable that such a kind of animating images for accumulation have been interframe coded from a view point of the compression efficiency. In the second embodiment, a case where the animating image-coded by the MPEG system is read out from the CD-ROM will be described. Codes of one sequence read out from the CD-ROM player 20 are decoded by the MPEG codec 6 via the computer bus 8 in a real-time manner. The frame images (360 pixels×240 lines; Y, Cb, and Cr signals) sequentially decoded are again sequentially converted every frame to the JPEG codes as intraframe codes by the JPEG codec unit 3 through the computer bus 8. Simultaneously, the frame images decoded by the MPEG codec 6 are normally reproduced onto the display 7 via the video RAM unit 5. The sequence coded by the JPEG codec unit 3 is sequentially stored into the disk 4 by an amount corresponding to a sequence of a necessary length. After completion of the storage, as described in the first embodiment, the frame edition can be performed as necessary. It is also possible to again convert the intraframe code to the interframe code in order to raise the compression efficiency.

As mentioned above, while decoding the interframe coded animating image, by re-encoding to the intraframe code, the edition on the frame unit basis can be promptly and easily performed.

<Third Embodiment>

Figure 4:
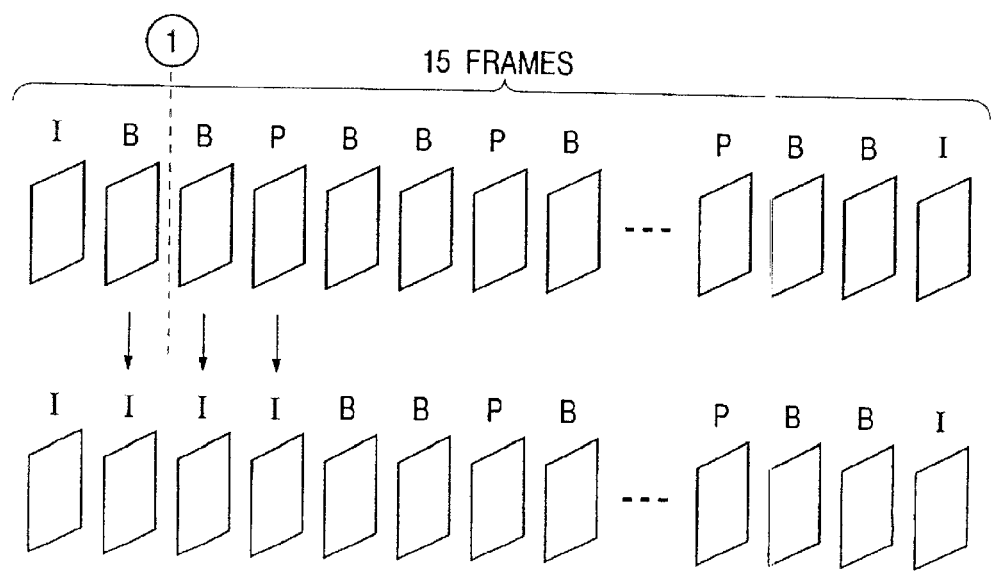
FIG. 4 shows an example such that an intra frame coding was performed to a part of a sequence.

In the second embodiment, although the MPEG codes have been decoded and converted to the intraframe codes with respect to all of the sequences, only the neighboring frames to be edited can be also converted to the intraframe codes as follows. In FIG. 3, in a recording medium (the CD-ROM in the third embodiment) which can perform the optical recording, magnetic recording, or the like, the MPEG codes (interframe codes) stored in the CD-ROM are decoded by the MPEG codec 6 and only the display operation is performed. In this instance, the re-encoding by the JPEG codec unit is not executed. As for the display, the edition reproduction is performed as described in FIG. 2. As mentioned above, the necessary portions are designated by the edition tool bar 11. In the case where the editing portions have been interframe coded, however, the frame edition cannot be easily performed. Therefore, a partial intraframe coding conversion as shown in FIG. 4 is executed. As an interframe code, the I, P, and B frames are encoded every fifteen frames between the I frames by the MPEG encoding as described in FIG. 5.

For example, in case of cutting the portion of ① between the B frames in each of the second and third frames in FIG. 4, the last B frame of the previous sequence of the cut portion cannot be reproduced. In the later sequence, a state in which up to the next I frame cannot be reproduced (broken link) occurs. In the embodiment, therefore, four frames between the P frames (between the I and P frames in case of the I frame) including the cut portion are decoded and are again encoded to the I frame, so that the frame edition at an arbitrary position can be performed. Four frames including the portion to be cut in the sequence which was read out from the CD-ROM player 20 in FIG. 3 are decoded by the MPEG codec 6 and can be also partially again encoded as an intraframe by the CPU 9 in an operational processing, i.e., a software manner. In place of again encoding to the intraframe in a software manner, the intracoding can be also performed by the JPEG codec 3. Instead of decoding all the encoded frames, by partially again encoding to the intraframe code only frame images in minimum number including frame images indicated to be edited upon editing, in which the frames which are not edited can be reproduced later, as in the embodiment, there is no need to again encode to the interframe code for the purpose of the improvement of a compression ratio after the edition. A deterioration of the picture quality can be also minimized to the portions before and after the edition.

<Fourth Embodiment>

The fourth embodiment will now be described with respect to the case where the MPEG system is used as a coding system of animating image coding data which is inputted, the JPEG system is used as an intraframe coding system that is used in the apparatus, all of the frames of the animating image coding data which is inputted are code converted, and an editing operation is executed.

Figure 7:
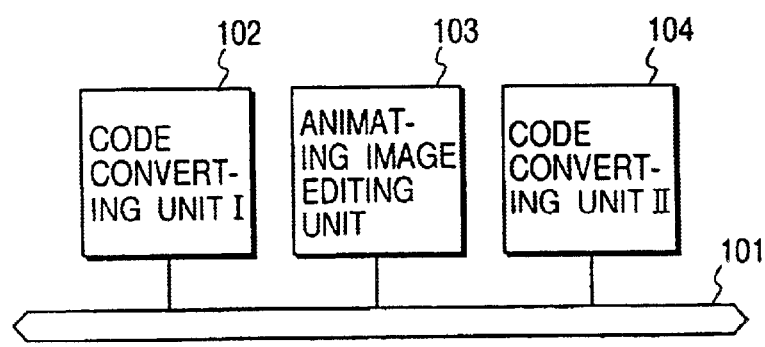
FIG. 7 is a block diagram showing a constructional outline of a system according to the fourth to sixth embodiments.

FIG. 7 is a constructional diagram of the animating image editing apparatus of the embodiment. Reference numeral 101 denotes a system bus to control the whole system; 102 a code converting unit I for decoding animating image coding data that is inputted and for converting into the intraframe coding data; 103 an animating image editing unit for decoding the internal coding data and for performing an animating image edition; and 104 a code converting unit II for again converting the result of the animating image edition to the animating image coding data.

Figure 8:
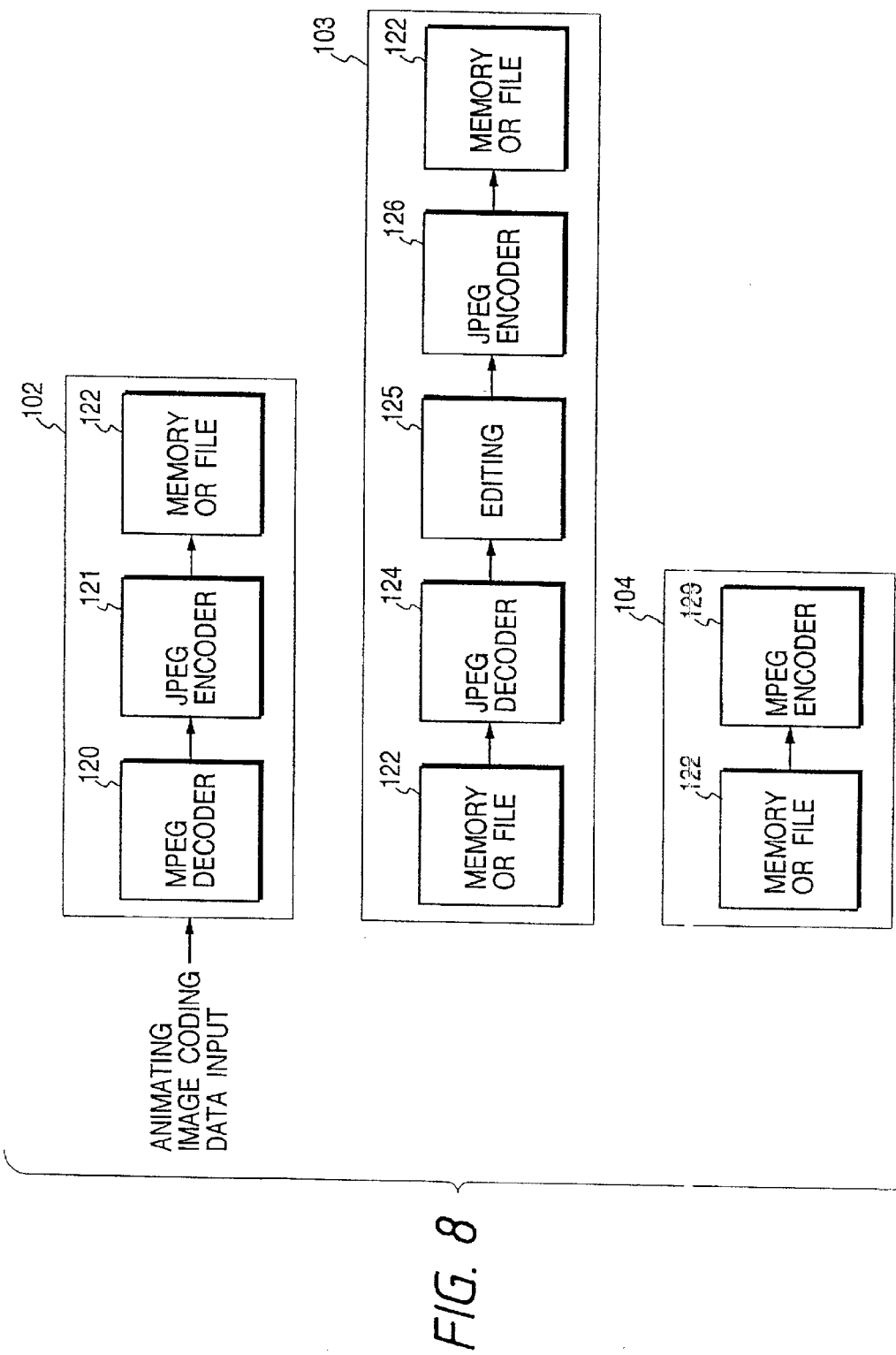
FIG. 8 is a block diagram of a main section of the fourth embodiment.

FIG. 8 shows a detailed block construction of each processing unit. In the diagram, the same blocks as those shown in FIG. 7 are designated by the same reference numerals.

The code converting unit I (102) comprises three blocks 120, 121, and 122. Reference numeral 120 denotes an MPEG decoder for decoding a bit stream which is animating image coding data that is inputted and which was encoded by the MPEG system; 121 denotes a JPEG encoder for encoding the decoded frame image data by the JPEG system as an intraframe code; and 122 a memory or file to store an output of the JPEG encoder 121.

The animating image editing unit 103 comprises five blocks 122, 124, 125, 126, and 122. Reference numeral 124 denotes a JPEG decoder; 125 an editing unit to edit the animating image on a frame unit basis; 126 a JPEG encoder to JPEG encode the image data edited by the editing unit 125 on the frame unit basis; and 122 the memory or file to store an output of the JPEG encoder 126.

The code converting unit 104 comprises two blocks 122 and 129. Reference numeral 129 denotes an MPEG encoder to encode by the MPEG system.

A processing procedure of the animating image editing apparatus of the fourth embodiment will now be described hereinbelow with reference to FIG. 8.

First, when the animating image coding data which has previously been stored in the memory or the like and encoded by the MPEG system is designated from the user by using a pointing device such as a mouse or the like (not shown), the designated animating image coding data is sequentially decoded by the MPEG decoder 120 in the code converting unit 102 in accordance with the order of the MPEG bit stream. Subsequently, the image data of every frame as an output result is inputted to the JPEG encoder 121 and is JPEG encoded on a frame unit basis and is stored into the memory or file 122. The user retrieves an arbitrary frame to be edited from the image data which was stored in the memory or file 122 and was JPEG encoded, so that an animating image editing process can be performed.

As an animating image edition, the frame designated by the user is read out from the memory or file 122 and is decoded by the JPEG decoder 124 and is returned to the frame image. An editing operation is executed by the editing unit 125 to the image data returned to the frame image. The editing operation in the embodiment denotes that the image data itself in the frame is rewritten. The frame image after completion of the editing operation is again encoded every frame image by the JPEG encoder 126 in order to store into the memory or file 122. When there are a plurality of frames to be edited, the above editing operation is repeated. After completion of the editing operations of all of the frame images to be edited, the coding data which was JPEG encoded every frame by the code converting unit 104 is read out from the memory or file 122. The animating image encoding is executed in the MPEG encoder 129 by the MPEG system to all of the frames.

According to the embodiment as mentioned above, after the intraframe coding using the JPEG system was performed to the input animating image coding data encoded by the MPEG system, the picture plane to be edited is retrieved and is subjected to the editing process and the animating image encoding is again executed. Thus, the animating image coding data can be edited and the memory capacity can be remarkably reduced as compared with that in case of decoding all of the animating image coding data.

<Fifth Embodiment>

The fourth embodiment has been described with respect to the example in which after all of the image data which had been animating image encoded by the MPEG system was decoded, it is edited. The fifth embodiment will be explained with respect to the case where only the image data of the portions necessary for edition is decoded from the image data which was animating image encoded by the MPEG system and is subjected to the editing process.

In the fifth embodiment, it is assumed that the image data which was animating image encoded by the MPEG system is intraframe encoded (intra-picture) every 15 frames. It is also assumed that 20 frames within a range from the 20th frame to the 40th frame are used as frames to which the user performs the editing process.

Figure 9:
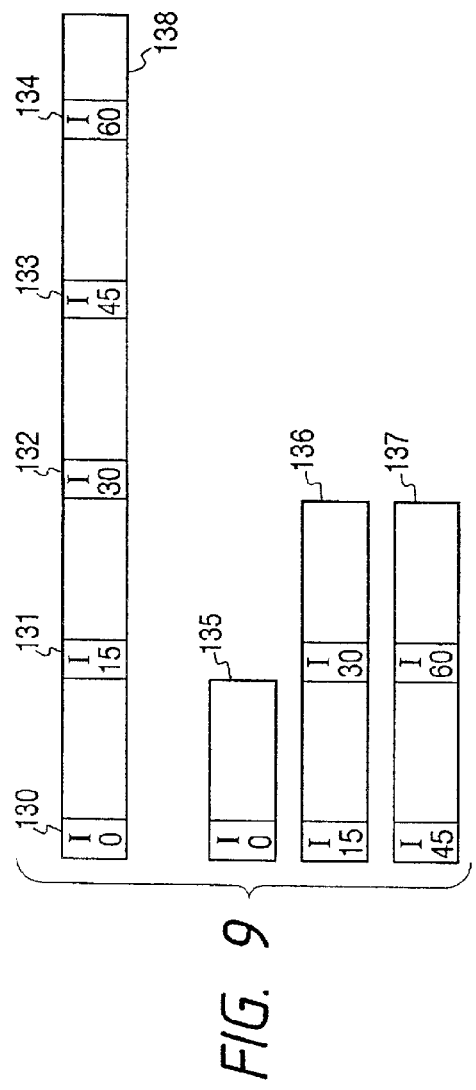
FIG. 9 is an explanatory diagram of the fifth embodiment.

In this case, the image data which is inputted and was animating image encoded by the MPEG system has a construction as shown at 138 in FIG. 9. In the diagram, reference numerals 130 to 134 denote positions of the intra-picture in the image data which is inputted and was animating image encoded by the MPEG system. For example, the intra-picture 130 indicates the 0th frame. The next intra-picture 131 indicates the 15th frame. In case of the embodiment, since 20 frames (the 20th frame to the 40th frame) are edited, it is sufficient to decode and edit the data with a range from the intra-picture 131 to the intra-picture 133 in a bit stream 138.

A construction to execute the above processes will now be described with reference to FIG. 10.

In the diagram, blocks which execute operations similar to those in the fourth embodiment are designated by the same reference numerals. In the diagram, reference numeral 140 denotes an intra-detector to detect a frame image as an intra-picture in the image data which was animating image encoded by the MPEG system.

First, the bit stream 138 is inputted to the intra-detector 140. After that, the data within a range from the intra-picture 130 to the frame before the intra-picture 131, namely, to the 14th frame is outputted to a line 141 as an inputted bit stream and is stored into a predetermined file. When the code of the intra-picture 131 is detected, the frames of the intra-picture 131 and subsequent intra-pictures are outputted to a line 142 in order to perform the editing process. The data of the bit stream outputted to the line 142 passes through the MPEG decoder 120 and JPEG encoder 121 and each frame is encoded by the JPEG system and is supplied to the memory or file 122. The intra-detector 140 outputs the signal to the line 142 until the code of the intra-picture 133 is detected. After the code of the intra-picture 133 was detected, the output is again returned to the line 141 and the subsequent bit stream is outputted to another file different from the above file.

Coding data 135 and 137 are filed as mentioned above without being subjected to the editing process.

Processes such that the user edits the 20 frames (the 20th to 40th frame) will now be explained.

The frames (the 15th to 44th frame) have been stored in the memory or file as coding data which was encoded by the JPEG system. The JPEG coding data within a range from the 20th frame to the 40th frame is read out from the memory or file 122 and is decoded by the JPEG decoder 124, so that the image data is formed.

After that, the frames (the 20th to 40th frames) are edited by the editing unit 125 and are JPEG encoded by the JPEG encoder 121 and are stored into the memory or file 122. After completion of the editing operation, the JPEG coding data is read out from the memory or file 122 and is decoded into the image data by the JPEG decoder 124. The image data is further MPEG encoded by the MPEG encoder 129 and is outputted to a file or the like. The output result is filed as coding data 136 in FIG. 9.

The coding data 135, 136, and 137 are finally rearranged into a bit stream as one coding data by a CPU or the like (not shown), so that the edition of only the necessary frames which are desired by the user can be performed.

In the fifth embodiment, after completion of the animating image edition, the frames edited by the JPEG system are again encoded by the MPEG system. However, the invention is not limited to such a construction. It is also possible to construct as follows. Namely, the image data after the edition is stored into the memory or file 122 without being JPEG encoded. Only the frames which are not subjected to the editing process, namely, only the frames (the 15th to 19th frames and the 41st to 44th frames) as JPEG codes are decoded by the JPEG decoder 124 in the embodiment. The edited frames which are not encoded are directly outputted to the MPEG encoder without passing through the JPEG decoder 124.

With the above construction, when the animating image edition is executed to a predetermined frame, an amount of image data to be decoded can be reduced, so that the memory capacity to store the image data after it was decoded can be reduced. The time that is required for decoding can be also decreased. Consequently, the animating image edition can be executed at a high speed.

<Sixth Embodiment>

The above fifth embodiment has been described with respect to the case of using the JPEG system as an intraframe coding system. However, as shown in FIG. 11, the encoding process can be also performed by the intra-pictures in an MPEG chip. In the diagram, the component elements which execute the similar operations as those of the component elements in the fourth and fifth embodiments are designated by the same reference numerals.

Figure 10:
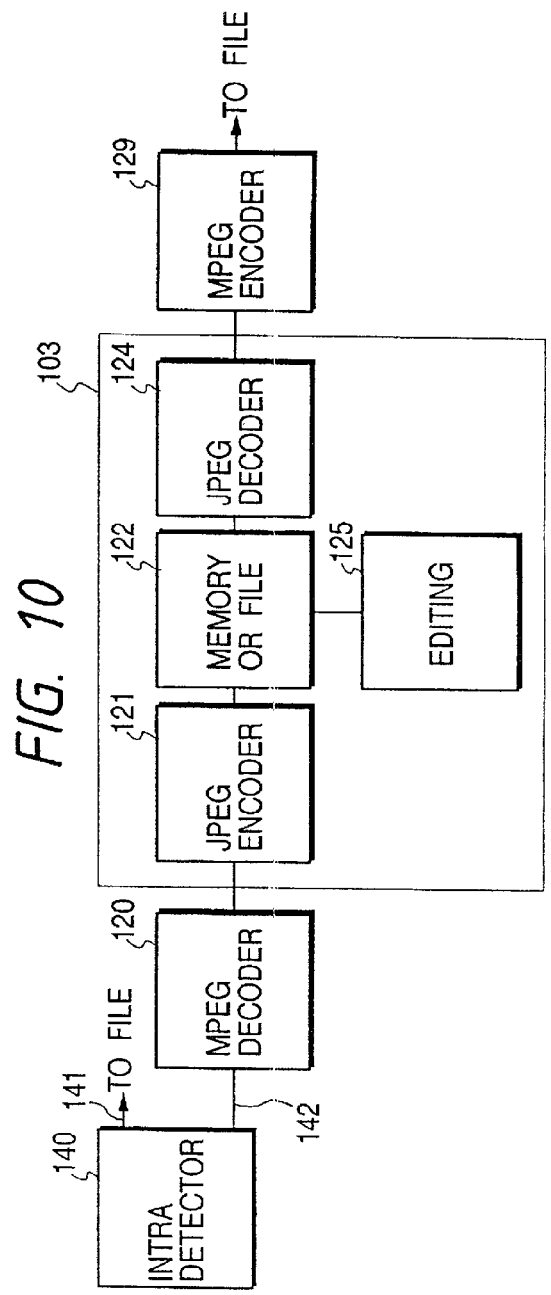
FIG. 10 is a block diagram of a main section of the fifth embodiment.

The sixth embodiment differs from FIG. 10 as a block diagram of the fifth embodiment with respect to a point that an MPEG encoder 150 is used in place of the JPEG encoder 121 and an MPEG decoder 151 is used in place of the JPEG decoder 124.

The detailed operations are substantially the same as those in the fifth embodiment except that the portions which are stored into the memory or file 122 are the coding data of the intra-pictures of the MPEG. Therefore, the description of the operation principle is omitted here.

Although the MPEG system has been used as an animating image coding system of the input in the sixth embodiment, the invention is not limited to such a system but can be also obviously applied to the H261 system or, further, to another animating image coding system.

Although the internal coding system has been described with respect to the JPEG system and the intra-pictures of the MPEG, the invention is not limited to them but can be also applied to any system so long as it is the intraframe coding system.

Although the embodiments have been described with respect to the example in which the image in the frame is changed as an animating image edition, the invention is not limited to such an edition. It is also possible to change the number of frames or to execute an editing operation in the time base direction such as extraction of frames, insertion of frames, or the like.

It will be also obviously understood that the animating image coding data is communicated from external communicating means in a real-time manner.

When the image data stored in the memory or file 122 is edited, the image of only the low frequency component is decoded from the image data of one frame and is displayed on a monitor (not shown), thereby deciding the edition image by using the image of a low resolution. After that, all of the images of one frame are displayed and are subjected to the actual editing process. Thus, the editing process can be performed at a high speed.

As described above, according to the embodiments 4 to 6, the animating image data which was encoded by the animating image coding system using the interframe correlation is once encoded by the intraframe coding system and is animating image edited and is again encoded by the animating image coding system. Thus, the animating image data of the coding data which cannot be directly animating image edited so far can be edited. The capacity of the image memory that is needed during the editing operation can be remarkably reduced.

Further, since the amount of animating image data to be decoded when a predetermined frame is edited can be decreased, the memory capacity can be saved and the processes can be executed at a high speed.

The present invention is not limited to the foregoing embodiments but many modifications and variations are possible within the spirit and scope of the appended claims of the invention.

What is claimed is:

1. An image processing method comprising:
   a) an input step of inputting moving image data encoded in a first encoding method using both intra-picture coding and inter-picture coding;
   b) a first decoding step of decoding the moving image data including intra-picture coding image data and inter-picture coding image data;
   c) a first encoding step of performing the intra-picture coding to the moving image data decoded in said first decoding step and storing the encoded data in a recording medium;
   d) a second decoding step of reading the moving image data encoded in said first encoding step from the recording medium and decoding the read data;
   e) an editing step of performing an editing process to at least one picture of the moving image data decoded in said second decoding step;
   f) a second encoding step of performing the intra-picture coding to the moving image data subjected to the editing process in said editing step and storing the encoded data in the recording medium; and
   g) a third encoding step of reading the moving image data encoded in said second encoding step from the recording medium, converting the read data in said first encoding method, and outputting the converted data.

2. A method according to claim 1, wherein said first encoding method is an MPEG encoding method.

3. A method according to claim 1, wherein, in said first decoding step, the moving image data necessary to the editing process is selected and decoded.

4. A method according to claim 1, wherein, in the editing process, a process to change the number of frames is performed.

5. A method according to claim 1, wherein, in said editing process, a process to insert a frame is performed.

6. An image processing apparatus which executes an image processing method, said method comprising:
   a) an input step of inputting moving image data encoded in a first encoding method using both intra-picture coding and inter-picture coding;
   b) a first decoding step of decoding the moving image data including intra-picture coding image data and inter-picture coding image data;
   c) a first encoding step of performing the intra-picture coding to the moving image data decoded in said first decoding step and storing the encoded data in a recording medium;
   d) a second decoding step of reading the moving image data encoded in said first encoding step from the recording medium and decoding the read data;

e) an editing step of performing an editing process to at least one picture of the moving image data decoded in said second decoding step;

f) a second encoding step of performing the intra-picture coding to the moving image data subjected to the editing process in said editing step and storing the encoded data in the recording medium; and g) a third encoding step of reading the moving image data encoded in said second encoding step from the recording medium, converting the read data in said first encoding method, and outputting the converted data.

7. An image processing method comprising:

a) an input step of inputting moving image data encoded in a first encoding method using both intra-picture coding and inter-picture coding;

b) a first decoding step of decoding the moving image data input including intra-picture coding image data and inter-picture coding image data;

c) a first encoding step of performing the intra-picture coding to the moving image data decoded in said first decoding step and storing the encoded data in a recording medium;

d) a second decoding step of reading the moving image data encoded in said first encoding step from the recording medium and decoding the read data;

e) an editing step of performing an editing process to at least one picture of the moving image data decoded in said second decoding step;

f) a second encoding step of performing the intra-picture coding to the moving image data subjected to the editing process in said editing step and storing the encoded data in the recording medium;

g) a third decoding step of reading the moving image data encoded in said second encoding step and decoding the read data; and h) a third encoding step of encoding the moving image data decoded in said third decoding step in the first encoding method, and outputting the encoded data.

8. A method according to claim 7, wherein the moving image data input in said input step is the data encoded in an MPEG encoding method.

9. A method according to claim 7, wherein, in said first decoding step, the moving image data necessary to the editing process is selected and decoded.

10. A method according to claim 7, wherein, in the editing process, a process to change the number of frames is performed.

11. A method according to claim 7, wherein, in said editing process, a process to insert a frame is performed.

12. An image processing apparatus which executes an image processing method, said method comprising:

a) an input step of inputting moving image data encoded in a first encoding method using both intra-picture coding and inter-picture coding;

b) a first decoding step of decoding the moving image data input in said input step including intra-picture coding image data and inter-picture coding image data;

c) a first encoding step of performing the intra-picture coding to the moving image data decoded in said first decoding step and storing the encoded data in a recording medium;

d) a second decoding step of reading the moving image data encoded in said first encoding step from the recording medium and decoding the read data;

e) an editing step of performing an editing process to at least one picture of the moving image data decoded in said second decoding step;

f) a second encoding step of performing the intra-picture coding to the moving image data subjected to the editing process in said editing step and storing the encoded data in the recording medium;

g) a third decoding step of reading the moving image data encoded in said second encoding step and decoding the read data; and h) a third encoding step of encoding the moving image data decoded in said third decoding step in the first encoding method, and outputting the encoded data.

* * * * *

UNITED STATES PATENT AND TRADEMARK OFFICE
CERTIFICATE OF CORRECTION

| | | |
|---|---|---|
| PATENT NO. | : 6,853,378 B2 | Page 1 of 1 |
| APPLICATION NO. | : 08/907635 | |
| DATED | : February 8, 2005 | |
| INVENTOR(S) | : Miyuki Enokida et al. | |

It is certified that error appears in the above-identified patent and that said Letters Patent is hereby corrected as shown below:

On the title page, item:

[57] ABSTRACT:

Line 4, "edition, the" should read --edition. The--.

COLUMN 1:

Line 11, "it" should be deleted.
    Line 39, "draw back" should read --drawback--.

COLUMN 2:

Line 24, "hot" should read --not--.

COLUMN 3:

Line 2, "intra frame" should read --intraframe--.

COLUMN 9:

Line 1, "construct" should read --construct an embodiment--.

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,853,378 B2 | Page 1 of 1 |
| APPLICATION NO. | : 08/907635 | |
| DATED | : February 8, 2005 | |
| INVENTOR(S) | : Miyuki Enokida et al. | |

It is certified that error appears in the above-identified patent and that said Letters Patent is hereby corrected as shown below:

[57] ABSTRACT:

Line 4, "edition, the" should read --edition. The--.

COLUMN 1:

Line 11, "it" should be deleted.
Line 39, "draw back" should read --drawback--.

COLUMN 2:

Line 24, "hot" should read --not--.

COLUMN 3:

Line 2, "intra frame" should read --intraframe--.

COLUMN 9:

Line 1, "construct" should read --construct an embodiment--.

Signed and Sealed this

Twentieth Day of March, 2007

JON W. DUDAS
*Director of the United States Patent and Trademark Office*